US010663109B2

United States Patent
Guo et al.

(10) Patent No.: US 10,663,109 B2
(45) Date of Patent: May 26, 2020

(54) TRANSLATION AXIS ASSEMBLY AND GIMBAL PLATFORM USING SAME

(71) Applicant: SZ DJI TECHNOLOGY CO., LTD., Shenzhen (CN)

(72) Inventors: Shanguang Guo, Shenzhen (CN); Yanchong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 252 days.

(21) Appl. No.: 15/604,842

(22) Filed: May 25, 2017

(65) Prior Publication Data

US 2017/0261157 A1    Sep. 14, 2017

Related U.S. Application Data

(63) Continuation of application No. PCT/CN2014/092539, filed on Nov. 28, 2014.

(51) Int. Cl.
*F16M 11/12* (2006.01)
*F16M 13/02* (2006.01)
(Continued)

(52) U.S. Cl.
CPC ........ *F16M 13/022* (2013.01); *F16M 11/048* (2013.01); *F16M 11/123* (2013.01); *F16M 11/18* (2013.01); *F16M 11/205* (2013.01); *F16M 11/2085* (2013.01); *F16M 11/24* (2013.01); *F16M 13/04* (2013.01); *F16M 2200/027* (2013.01); *F16M 2200/041* (2013.01);
(Continued)

(58) Field of Classification Search
CPC .. F16M 13/022; F16M 11/048; F16M 11/123; F16M 11/18; F16M 11/205; F16M 11/2085; F16M 11/24; F16M 2200/041; F16M 2200/044; G03B 17/561
USPC .......................................................... 248/550
See application file for complete search history.

(56) References Cited

U.S. PATENT DOCUMENTS 6,434,329 B1    8/2002  Dube et al.
8,861,947 B2 *  10/2014  Webb ................... H04N 5/2328
                                                          396/55
(Continued)

FOREIGN PATENT DOCUMENTS

CN    201561008 U    8/2010
CN    102070111 A    5/2011
(Continued)

OTHER PUBLICATIONS

The World Intellectual Property Organization (WIPO) International Search Report for PCT/CN2014/092539 dated Jul. 29, 2015 7 Pages.

*Primary Examiner* — Nkeisha Smith
(74) *Attorney, Agent, or Firm* — Anova Law Group, PLLC

(57) ABSTRACT

A translation axis assembly includes a supporting arm, a connecting plate, and a center-of-gravity adjusting device connected between the supporting arm and the connecting plate. The center-of-gravity adjusting device is configured to adjust a position of the supporting arm on the connecting plate to adjust a center of gravity of the translation axis assembly. The center-of-gravity adjusting device includes a locking assembly configured to allow the supporting arm and the connecting plate to be in a loose fit or to hold tightly to each other.

18 Claims, 7 Drawing Sheets

(51) Int. Cl.
*F16M 11/20* (2006.01)
*F16M 11/24* (2006.01)
*F16M 11/04* (2006.01)
*F16M 11/18* (2006.01)
*F16M 13/04* (2006.01)
*G03B 17/56* (2006.01)

(52) U.S. Cl.
CPC ..... *F16M 2200/044* (2013.01); *G03B 17/561* (2013.01)

(56) References Cited

U.S. PATENT DOCUMENTS

| | | | | |
|---|---|---|---|---|
| 8,985,878 B2* | 3/2015 | Di Leo | | G03B 17/563 |
| | | | | 396/422 |
| 9,360,740 B2* | 6/2016 | Wagner | | F16M 11/18 |
| 9,574,703 B2* | 2/2017 | Firchau | | F16M 11/041 |
| 9,765,926 B2* | 9/2017 | Chen | | F16M 13/04 |
| 9,851,046 B2* | 12/2017 | Pan | | F16M 11/18 |
| 9,891,506 B1* | 2/2018 | Wei | | G03B 17/561 |
| 9,904,147 B2* | 2/2018 | Zhao | | G03B 17/561 |
| 9,973,665 B2* | 5/2018 | Saha | | H04N 5/2252 |
| 10,107,446 B2* | 10/2018 | Pan | | F16M 11/16 |
| 10,151,966 B2* | 12/2018 | Chapman | | G03B 17/561 |
| 10,178,295 B2* | 1/2019 | Zeng | | G03B 5/00 |
| 10,208,887 B2* | 2/2019 | Tian | | F16M 13/04 |
| 2004/0223078 A1* | 11/2004 | Zadok | | F16M 13/04 |
| | | | | 348/375 |
| 2005/0041966 A1 | 2/2005 | Johnson | | |
| 2005/0185089 A1* | 8/2005 | Chapman | | F16M 11/10 |
| | | | | 348/375 |
| 2014/0064719 A1* | 3/2014 | Harris | | F16M 11/10 |
| | | | | 396/420 |
| 2017/0108162 A1* | 4/2017 | Pan | | F16M 11/16 |
| 2017/0108761 A1* | 4/2017 | Pan | | F16M 11/02 |
| 2017/0115551 A1* | 4/2017 | Pan | | F16F 15/28 |
| 2017/0227834 A1* | 8/2017 | Zhao | | F16M 11/045 |
| 2017/0301230 A1* | 10/2017 | Liu | | G03B 17/561 |
| 2018/0059516 A1* | 3/2018 | Taylor | | G03B 17/00 |
| 2018/0106425 A1* | 4/2018 | Brown | | F16M 13/00 |
| 2018/0273203 A1* | 9/2018 | Zhang | | G03B 17/561 |
| 2018/0299752 A1* | 10/2018 | Zhao | | F16M 11/18 |
| 2018/0335178 A1* | 11/2018 | Bin | | F16M 13/04 |
| 2019/0002125 A1* | 1/2019 | Bin | | B64D 47/08 |

FOREIGN PATENT DOCUMENTS

| | | |
|---|---|---|
| CN | 202392373 U | 8/2012 |
| CN | 203258324 U | 10/2013 |
| CN | 103738836 A | 4/2014 |
| CN | 203907156 U | 10/2014 |
| CN | 203920299 U | 11/2014 |
| CN | 203930299 U | 11/2014 |
| CN | 203963419 U | 11/2014 |
| JP | 2000134558 A | 5/2000 |
| JP | 2006010833 A | 1/2006 |
| JP | 2007304429 A | 11/2007 |
| JP | 2008054024 A | 3/2008 |
| JP | 2008148386 A | 6/2008 |

* cited by examiner

TRANSLATION AXIS ASSEMBLY AND GIMBAL PLATFORM USING SAME

CROSS-REFERENCE TO RELATED APPLICATION

This is a continuation application of International Application No. PCT/CN2014/092539, filed on Nov. 28, 2014, the entire contents of which are incorporated herein by reference.

TECHNICAL FIELD

The present invention relates to the field of image capturing apparatuses and, in particular, to a translation axis assembly and a gimbal platform using same.

BACKGROUND OF THE DISCLOSURE

A gimbal platform can be used as a supporting worktable for mounting a camera, with the camera arranged on the gimbal platform. A camera lens can be adjusted to point to a target by adjusting the gimbal platform to achieve accurate image capturing, e.g., video or still image capturing, of the target. The gimbal platform can be compatible with many different types of cameras or lenses, and a center of gravity of each axis of the gimbal platform can be adjusted. However, since existing structures for adjusting the center of gravity adjusts the center of gravity using a relative displacement of the structure of the gimbal platform, and since most structural members bear a load, a static frictional force between structural members is large, and relative movements are difficult. Moreover, even a very small relative displacement may significantly influence the center of gravity, making it difficult to adjust the center of gravity.

SUMMARY OF THE DISCLOSURE

An objective of the present disclosure is to provide an adjustable translation axis assembly that balances the center of gravity, and a gimbal platform using same.

In accordance with the disclosure, there is provided a translation axis assembly including a supporting arm, a connecting plate, and a center-of-gravity adjusting device connected between the supporting arm and the connecting plate. The center-of-gravity adjusting device is configured to adjust a position of the supporting arm on the connecting plate to adjust a center of gravity of the translation axis assembly. The center-of-gravity adjusting device includes a locking assembly configured to allow the supporting arm and the connecting plate to be in a loose fit or to bold tightly to each other.

Also in accordance with the disclosure, there is provided a gimbal platform including a pitch axis assembly, a roll axis assembly in pivot connection with the pitch axis assembly and configured to drive the pitch axis assembly to rotate, and a translation axis assembly in pivot connection with the roll axis assembly and configured to drive the roll axis assembly to rotate. The translation axis assembly includes a supporting arm, a connecting plate, and a center-of-gravity adjusting device connected between the supporting arm and the connecting plate. The center-of-gravity adjusting device is configured to adjust, a position of the supporting arm on the connecting plate to adjust a center of gravity of the translation axis assembly. The center-of-gravity adjusting device includes a locking assembly configured to allow the supporting arm and the connecting plate to be in a loose fit or to hold tightly to each other.

DETAILED DESCRIPTION OF THE EMBODIMENTS

The technical solutions in the embodiments of the present disclosure are hereinafter described in more detail with reference to the accompanying drawings. The described embodiments are only some embodiments rather than all embodiments of the present disclosure. All other embodiments obtained by a person of ordinary skill in the art based on the embodiments of the present disclosure without creative efforts shall fall within the scope of the present disclosure.

It should be noted that, when a component is described as being "fixed to" another component, the component can be fixed directly on the other component, or via an intermediate component. When a component is described as being "connected" to another component, the component can be directly connected to the other component or via an intermediate component.

Unless otherwise defined, all technical and scientific terms used herein have the same meaning as commonly understood by one of ordinary skill in the art to which this disclosure belongs. The terms used in the description of the present disclosure are for the purpose of describing particular embodiments and are not intended to limit the present disclosure. The term "and/or" used herein includes any and all combinations of one or more a the associated listed items.

The implementation of the present disclosure is described in detail below with reference to exemplary embodiments.

Figure 1:
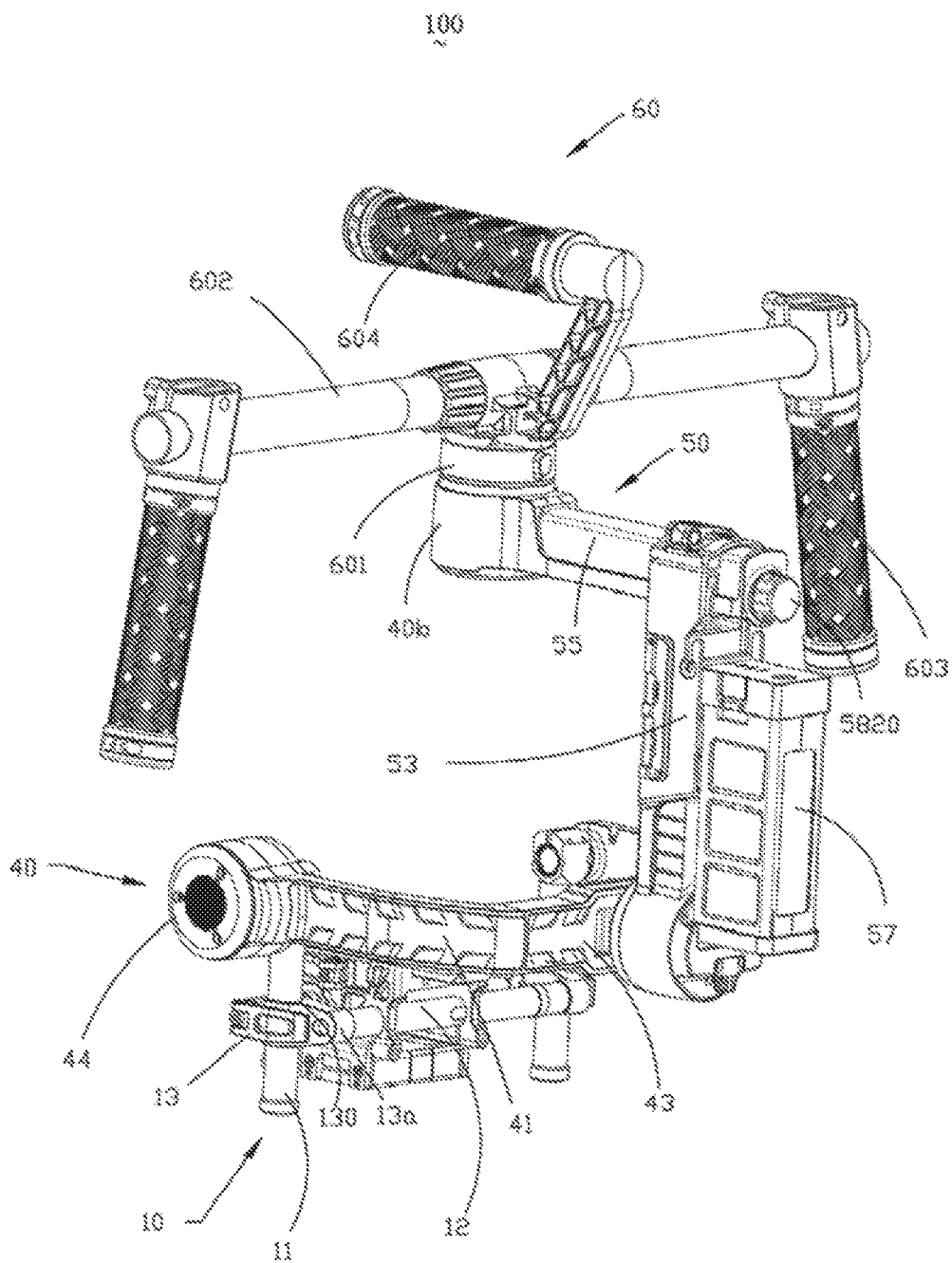
FIG. 1 is a perspective assembled schematic diagram of a gimbal platform, consistent with exemplary embodiments of the present disclosure.
Figure 2:
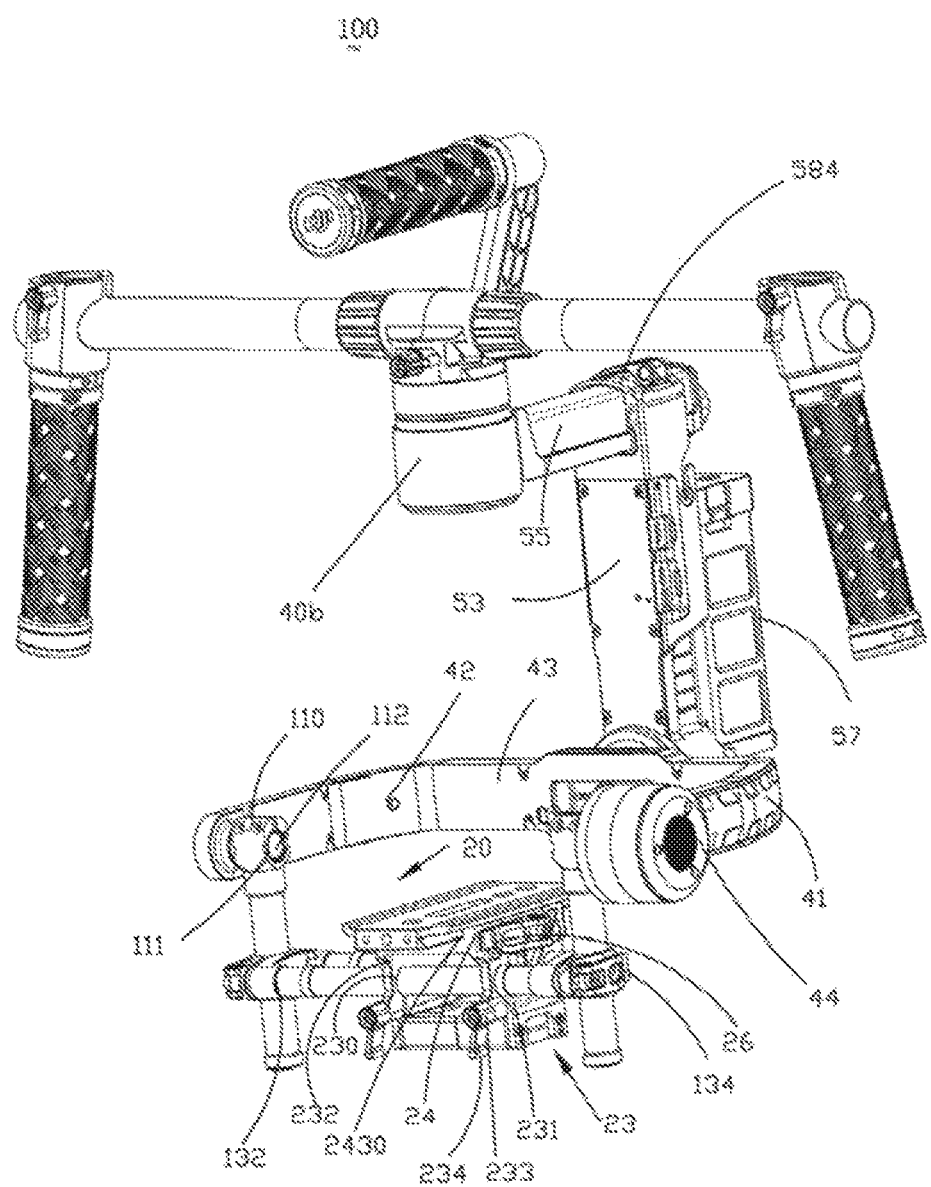
FIG. 2 is a perspective assembled schematic diagram of the gimbal platform in FIG. 1 from another viewing angle.
Figure 3:
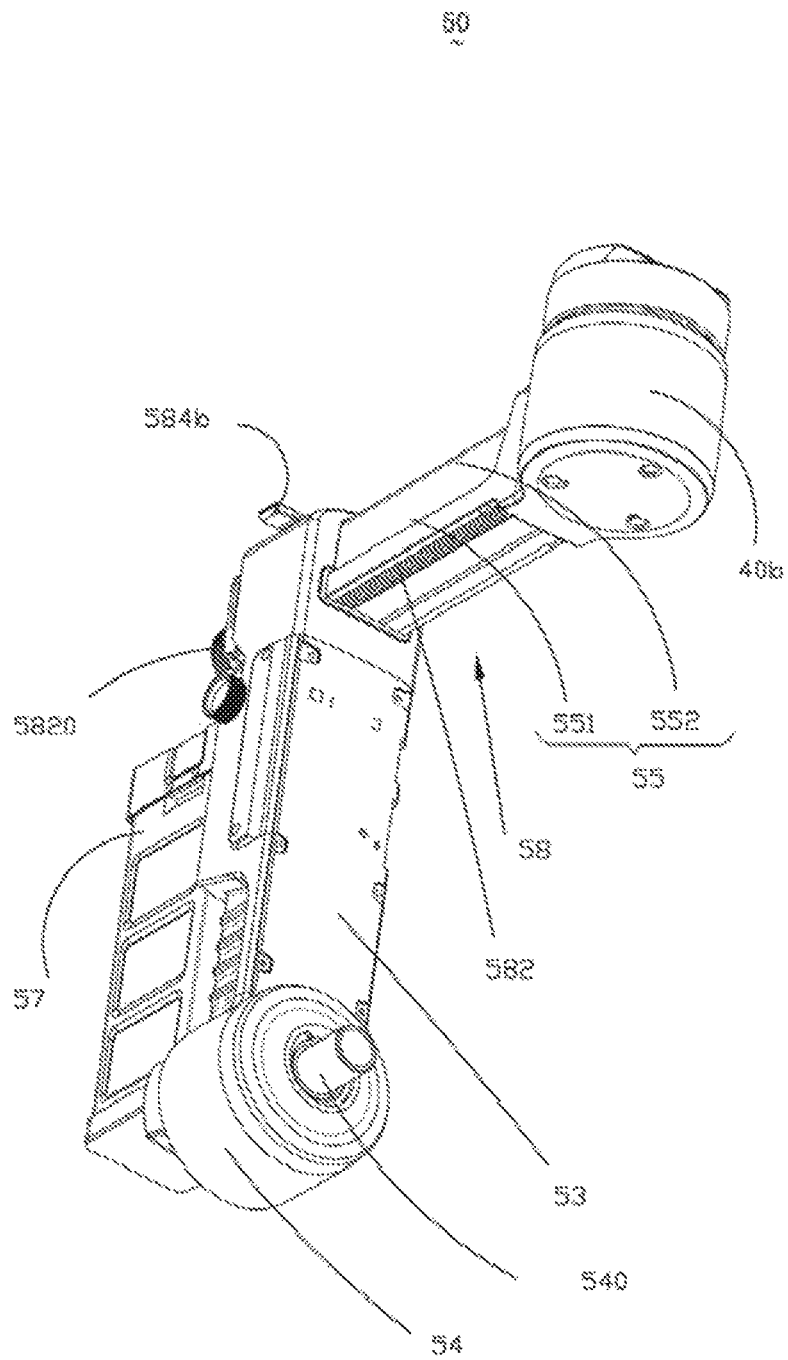
FIG. 3 is a perspective assembled schematic diagram of a translation axis assembly in FIG. 2.
Figure 4:
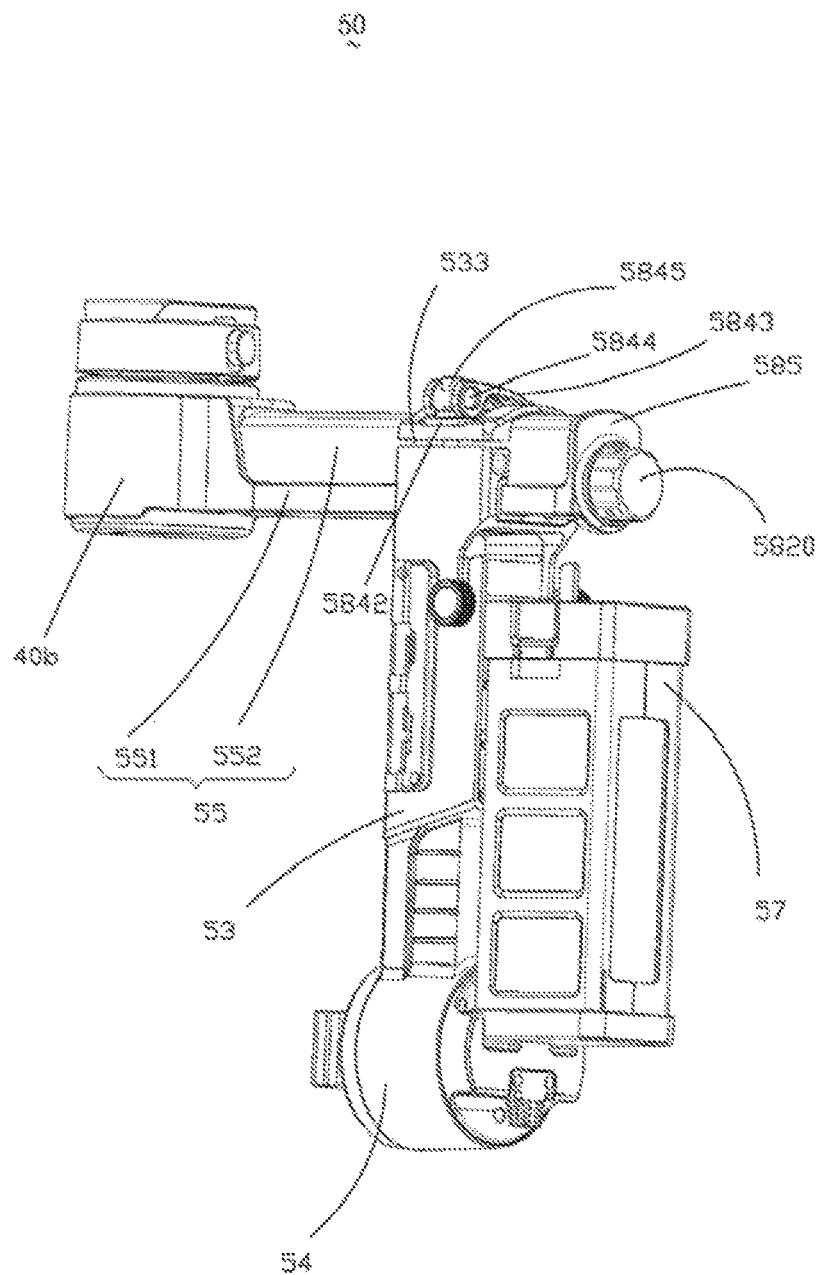
FIG. 4 is a perspective exploded schematic diagram of the translation axis assembly in FIG. 3 from another viewing angle.
Figure 5:
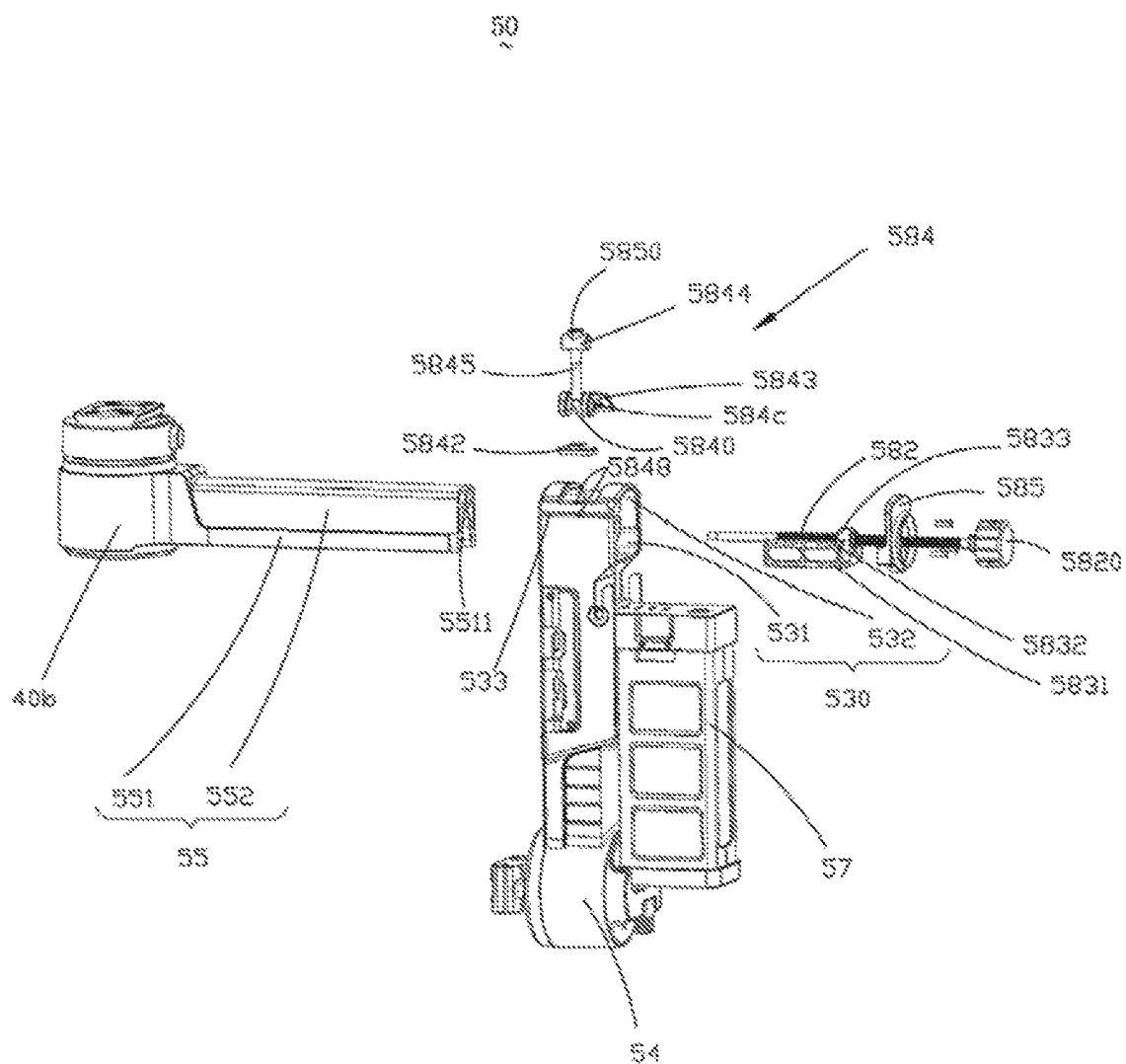
FIG. 5 is a perspective exploded schematic diagram of the translation axis assembly in FIG. 4.
Figure 6:
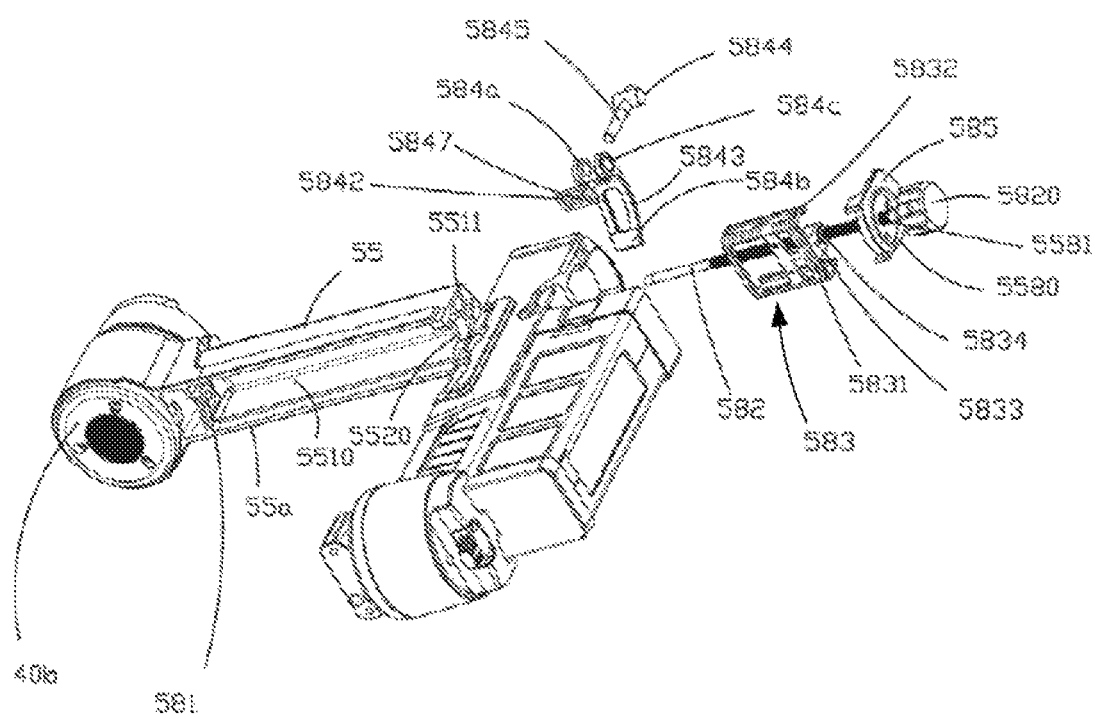
FIG. 6 is a perspective exploded schematic diagram of the translation axis assembly in FIG. 5 from another viewing angle.
Figure 7:
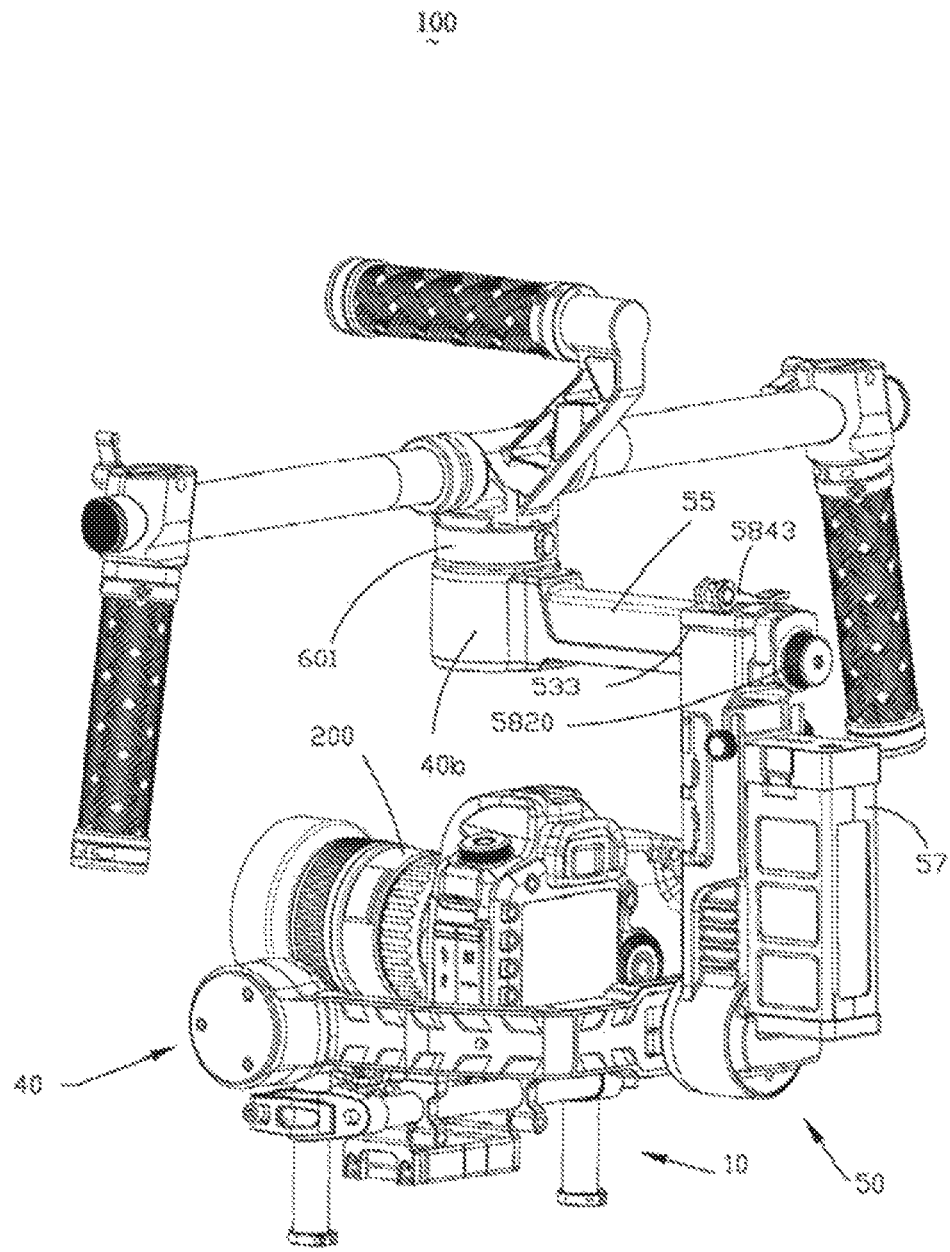
FIG. 7 is a diagram of the gimbal platform in FIG. 1 in use.

Referring to FIGS. 1 and 2 in conjunction, the present disclosure provides a gimbal platform 100 for carrying an imaging device 200 (as shown in FIG. 7). The imaging device 200 may be a photo camera, a video camera, or a lens.

The gimbal platform 100 comprises a pitch axis assembly 10, a support assembly 20 movably arranged on the pitch axis assembly 10, a roll axis assembly 40 in pivot connection with the pitch axis assembly 10 and configured to drive the pitch axis assembly 10 to rotate, a translation axis assembly 50 in pivot connection with the roll axis assembly 40 and configured to drive the roll axis assembly 40 to rotate, a driving part 40b for driving the translation axis assembly 50 to rotate, and a holding part 60.

The pitch axis assembly 10 comprises two pillars 11, two guide posts 12, and two position-locking devices 13. The two guide posts 12 are arranged approximately perpendicular to the two pillars 11, The two guide posts 12 can be moved in a lengthwise direction of the pillars 11 by moving the position-locking devices 13 along the lengthwise direction of the pillars, and can be fixed to any position on the pillars 11 by the position-locking devices 13.

For example, the pillars 11 are of a cylindrical shape, and each of the pillars 11 comprises a connecting end 110. The connecting end 110 is provided with a through-hole 111. In some embodiments, an axial direction of the through-hole 111 is approximately perpendicular to the lengthwise direction of the pillars 11. A rotary shaft 112 is arranged in one of the through-holes 111. In some other embodiments, the pillars 11 may have another shape.

In some embodiments, both of the guide posts 12 are of a cylindrical shape. In some other embodiments, the guide posts 12 may have another shape.

Each of the position-locking devices 13 comprises a collar 13a and a locking member 134. The collar 13a is provided with a snapping hole 130, and two receiving holes 132 respectively arranged at two sides of the snapping hole 130. An axial direction of the snapping hole 130 is approximately perpendicular to axial directions of the receiving holes 132. The shape and size of the snapping hole 130 correspond to the shape and size of the corresponding pillar 11. The two pillars 11 are sheathed in the corresponding snapping holes 130, respectively. Each of the receiving holes 132 receives one end of one of the guide posts 12, such that the two guide posts 12 are arranged approximately parallel to each other.

The locking member 134 is configured to lock the position-locking device 13 to any position on the corresponding pillar 11. For example, the locking member 134 can include a toggle clip made of a metal material. The locking member 134 can apply pressure to the collar 13a. As a result, a diameter of the snapping hole 130 of the collar 13a decreases such that the collar 13a can clamp on the pillars 11. In some embodiments, the mounting positions of the two guide posts 12 on the pillars 11 can be adjusted by releasing or tightening the locking members 134.

The support assembly 20 comprises two adapters 23 slidably arranged on the guide posts 12, a mounting plate 24, and a fastening device 26. The mounting plate 24 is fixed to the adapters 23. In some embodiments, the mounting plate 24 is fixed to the adapters 23 via bolts. The imaging device 200 is slidably arranged on the mounting plate 24. The fastening device 26 is arranged at one side of the mounting plate 24, and the fastening device 26 is configured to lock the imaging device 200 to any position on the mounting plate 24.

To adjust sliding of the adapters 23, each of the adapters 23 comprises a first pressing block 231 and a second pressing block 232 arranged oppositely. Two circular slots 230 are formed between the first pressing block 231 and the second pressing block 232, and the guide posts 12 are inserted in the circular slots 230. Each of the adapters 23 further comprises a screw 233 for locking the first pressing block 231 and the second pressing block 232 together. When the screws 233 are tightly locked, the adapters 23 are fixed to the guide posts 12. When the screws 233 are released, the adapters 23 can slide on the guide posts 12 in the lengthwise direction of the guide posts 12.

In some embodiments, for each of the screws 233, a wrench 234 is arranged on a nut of the screw 233. The wrench 234 extends in a direction approximately perpendicular to the lengthwise direction of the screw 233. The screw 233 can be locked by turning the wrench 234 to rotate in a locking direction, and can be released by turning the wrench 234 to rotate in a direction opposite to the locking direction. Thus, sliding and fixing of the adapters 23 can be controlled.

The mounting plate 24 is fixed to the second pressing blocks 232. The mounting plate 24 is provided with a sliding groove 2430. In some embodiments, the sliding groove 2430 includes a dovetail sliding groove.

The roll axis assembly 40 comprises a first supporting arm 41, a second supporting arm 42 arranged symmetrically to the first supporting arm 41, a connecting arm 43 connecting the first supporting arm 41 and second supporting arm 42, and a first driving device 44.

In some embodiments, to reduce the number of parts of the assembly, improve the assembly process, decrease the rotational resistance of the first driving device 44, and improve the rotation smoothness of the first driving device 44 and the roll axis assembly 40, the first supporting arm 41, the connecting arm 43, and the second supporting arm 42 are integrally formed by pressure casting using a magnesium-aluminium alloy.

In some embodiments, the first driving device 44 includes a brushless motor, and a motor rotary shaft (not shown in the figure) of the first driving device 44 is fixedly connected to the through-hole 110 of one of the pillars 11, and configured to drive the pillars 11 to rotate, so as to drive the pitch axis assembly 10 to rotate. In some embodiment, an axial direction of the motor rotary shaft of the first driving device 44 is approximately perpendicular to a lengthwise direction of the second supporting arm 42. The first driving device 44 drives the pitch axis assembly 10 to rotate, so as to adjust a capturing angle of the imaging device 200 and adjust the rotation speed in time to adapt to various pose positions.

The first driving device 44 may also be a brush electric machine or motor, and is not limited to the brushless motor described above.

As shown in FIGS. 3-6, the translation axis assembly 50 comprises a third supporting arm 53, a second driving device 54, a connecting plate 55, a battery 57, and a center-of-gravity adjusting device 58 arranged between the connecting plate 55 and the third supporting arm 53 and configured to adjust the position of the third supporting arm 53 on the connecting plate 55.

The second driving device 54 is arranged at one end of the third supporting arm 53. In some embodiments, the second driving device 54 includes a brushless motor, with a rotor assembly and a stator assembly thereof received directly in the third supporting arm 53, i.e., the third supporting arm 53 serves as a housing for receiving the rotor assembly and the stator assembly of the second driving device 54 to obviate the need for an additional housing and to save cost.

The other end of the third supporting arm 53 distal from the second driving device 54 is provided with a penetration hole 530. In some embodiments, the penetration hole 530 comprises a first receiving hole 531 of a rectangular shape and a second receiving hole 532 of a circular arc shape. The first receiving hole 531 is in communication with the second receiving hole 532. The first receiving hole 531 is closer to the second driving device 54 than the second receiving hole 532. A locking hole 533 is provided on an outer side surface of the end of the third supporting arm 53 distal from the second driving device 54. The locking hole 533 is in communication with the second receiving hole 532.

The battery 57 is arranged on the third supporting arm 53, and is configured to provide electrical energy for the operation of the whole gimbal platform 100.

In some embodiments, the second driving device 54 can also be additionally provided with a housing. During assembling, the housing receiving the rotor assembly and stator assembly can be assembled onto the third supporting arm 53.

The second driving device 54 is configured to drive the roll axis assembly 40 to rotate. For example, a rotary shaft 540 of the second driving device 54 can be fixed in a center portion of the connecting arm 43 and is configured to drive the roll axis assembly 40 to rotate.

The connecting plate 55 is connected to the end of the third supporting arm 53 distal from the roll axis assembly 40. The connecting plate 55 is approximately perpendicular to the third supporting arm 53, and is approximately parallel to the rotary shaft 540 of the second driving device 54. The connecting plate 55 comprises a bottom surface 55a in contact with the third supporting arm 53. The bottom surface 55a is provided with a receiving groove 5510. The connecting plate 55 comprises an outer side wall 5511, and the outer side wall 5511 is provided with a shaft hole 5520. In some embodiments, the connecting plate 55 comprises a first guide part 551 and a second guide part 552 connected to the first guide part 551. The first guide part 551 extends on an outer side such of the second guide part 552, and protrudes relative to the second guide part 552. The first guide part 551 is of a rectangular shape. The second guide part 552 is matched with the second receiving hole 532, and the second guide part 552 is of a circular arc shape.

The shape and size of the penetration hole 530 may be designed according to practical needs, and the shape and size of the connecting plate 55 match with the shape and size of the penetration hole 30. They are not limited to those described above.

The center-of-gravity adjusting device 58 comprises a bearing 581, a lead screw 582, a moving member 583 rotatable and movably arranged on the lead screw 582, and a locking assembly 584.

The bearing 581 is fixed in the receiving groove 5510. The axis of the bearing 581 is approximately perpendicular to the lengthwise direction of the third supporting arm 53. One end of the lead screw 582 passes through the shaft hole 5520 in the outer side wall 5511, and is sheathed in the bearing 581 of the receiving groove 5510. In some embodiments, for facilitating the rotation of the lead screw 582, a rotary handle 5820 is provided at the end of the lead screw 582 that is close to the outer side wall 5511. The rotary handle 5820 can be fixedly connected to the lead screw 582.

The shape and size of the moving member 583 are about the same as the shape and size of the first receiving hole 531, respectively, i.e., the moving member 583 matches the first receiving hole 531. The moving member 583 can be fixedly arranged in the first receiving hole 531. The moving member 583 comprises a first moving part 5831, a second moving part 5832 connected to the first moving part 5831, and a guide part 5833. The guide part 5833 is also referred to as a "moving member guide part." The moving member 583 can be fixedly connected to the third supporting arm 53, for example, by fixedly connecting the first moving part 5831 to the third supporting arm 53 via a bolt. The second moving part 5832 extends on both sides of the first moving part 5831, and the second moving part 5832 is configured to clamp the first guide part 551 of the connecting plate 55. The guide part 5833 of the moving member 583 is provided with a threaded hole 5834. The central axis of the threaded hole 5834 is approximately parallel to the lengthwise direction of the lead screw 582.

In some other embodiments, the first moving part 5831 may be fixedly connected to the third supporting arm 53 by welding or gluing.

In some embodiments, the center-of-gravity adjusting device 58 further comprises a fixing plate 585 fixing plate configured to be fixed to the outer side wall 5511 of the connecting plate 55, e.g., via a bolt. A groove 5580 is provided on the end surface of the fixing plate 585 that is distal from the connecting plate 55, and a through-hole 5581 is provided at the bottom of the groove 5580. The rotary handle 5820 is partially received in the groove 5581 and can rotate in the groove 5581. The fixing plate 585 has a size larger than the size of the outer side wall 5511 to prevent the connecting plate 55 from separating from the penetration hole 530.

In some embodiments, in order to save materials, the fixing plate 585 may be omitted. In some embodiments, the fixing plate 585 can be fixedly connected to the outer side wall 5511 by gluing or welding.

During assembly, the moving member 583 can be fixedly arranged in the first receiving hole 531, then one end of the connecting plate 55 can be passed through the penetration hole 530 to allow the second moving part 5832 of the moving member 583 to clamp the first guide part 551 of the connecting plate 55. Thereafter, the fixing plate 585 can be fixed to the outer side wall 5511 of the connecting plate 55, and then the rotary handle 5820 can be fixedly connected to the lead screw 582. Finally, the lead screw 582 can be passed through the through-hole 5581 of the fixing plate 585 to be in a threaded connection with the threaded hole 5834 of the moving member 583, such that one end of the lead screw 582 passes through the shaft hole 5520 and is sheathed in the bearing 581 of the receiving groove 5510.

The locking assembly 584 is arranged at the side of the third supporting arm 53 close to the locking hole 533. The locking assembly 584 is configured to lock the connecting plate 55 to the third supporting arm 53. In some embodiments, as shown in, e.g., FIG. 5, the locking assembly 584 comprises a pad 5842, a wrench 5843, a pin 5844, and a fixing bolt 5845.

In some embodiments, the pad 5842 is made of polyoxymethylene, and a via hole 5847 is provided in the center of the pad 5842.

The wrench 5843 comprises a rotating part 584a and a turning part 584b distal from the rotating part 584a. The rotating part 584a extends to the turning part 584b and is provided with a receiving part 5840 running through the rotating part 584a. A first through-hole 584c is provided in the wall of the rotating part 584a. The axial direction of the first through-hole 584c is approximately parallel to the opening direction of the locking hole 533. The receiving part 5840 is in communication with the first through-hole 584c.

The shape and size of the pin 5844 match the shape and size of the first through-hole 584c, respectively. In some embodiments, a second through-hole 5850 is provided in the center of the pin 5844.

When assembling the locking assembly 58, the pin 5844 can be inserted into the first through-hole 584c first. Then the pad 5842 can be placed at the side of the third supporting arm 53 that is closer to the locking hole 533, i.e., the pad 5842 can be placed adjacent to the locking hole 533. Thereafter, the fixing bolt 5845 can be passed through the second through-hole 5850 and the via hole 5847 successively and come into a threaded connection with a threaded hole 5848 provided in the third supporting arm 53, the threaded hole 5848 in the third supporting arm 53 running through the locking hole 533. The rotating part 584a of the wrench 5843 abuts against the pad 5842.

In some embodiments, the locking assembly 584 can have a different structure, so long as the locking assembly 584 can separate and lock the connecting plate 55 and the third supporting arm 53.

In some embodiments, the driving part 40b includes a brushless motor connected to the connecting plate 55 and the holding part 60. The driving part 40b is configured to drive the translation axis assembly 50 to rotate in 360° in a horizontal plane.

The holding part 60 is in the shape of a bent rod. For example, the holding part 60 comprises a connecting part 601, a supporting part 602, and a hand-held part 603. The supporting part 602 includes a rod member, and the connecting part 601 is removably connected to a geometrical center of the supporting part 602. The connecting part 601 is connected to the driving part 40b.

The hand-held part 603 comprises two cylindrical handgrips fixed to two ends of the supporting part 602, respectively.

The holding part 60 is fixedly provided with a handle 604, and the handle 604 is fixed to one side of the supporting part 602 opposite to the connecting part 601, such that the gimbal platform 100 can be conveniently carried when not in use. In some other embodiments, the holding part 60 is also provided with a locking mechanism such that the gimbal platform 100 can be fixed to a ladder to be moved by the ladder.

Referring to FIG. 7, when in use, the imaging device 200 is fixedly arranged on the support assembly 20. Mechanical analysis shows that, to improve the stability during image capturing by the imaging device 200, the center of gravity of the pitch axis assembly 10, the support assembly 20, the roll axis assembly 40, the translation axis assembly 50, and the imaging device 200 as a whole shall fall on a driving shall of the driving part 40b. As a result, the rotation of the translation axis assembly 50 to any angle will not produce a rotating torque, i.e., the translation axis assembly 50 will not swing back and forth as caused by a rotating torque. At the same time, the stability of the imaging device 200 during rotation can be improved.

When the center of gravity of the pitch axis assembly 10, the support assembly 20, the roll axis assembly 40, the translation axis assembly 50, and the imaging device 200 as a whole does not fall on the driving shall of the driving part 40b, the center of gravity of the pitch axis assembly 10, the support assembly 20, the roll axis assembly 40, the translation axis assembly 50, and the imaging device 200 as a whole can be adjusted by adjusting the center-of-gravity adjusting device 58, so that the center of gravity of the pitch axis assembly 10, the support assembly 20, the roll axis assembly 40, the translation axis assembly 50, and the imaging device 200 as a whole falls on the driving shaft on the driving part 40b. For example, the turning part 584b of the wrench 5843 can be turned to release the locking assembly 584, so that the size of the locking hole 533 is enlarged to allow the connecting plate 55 and the third supporting arm 53 to be in a loose fit. The rotary handle 5820 can then be rotated to rotate the lead screw 582 in the threaded hole 5834 in the guide part 5833. Under the guide of the rectangular first guide part 551, the moving member 583 can move in the lengthwise direction of the lead screw 582, such that the center of gravity of the pitch axis assembly 10, the support assembly 20, the roll axis assembly 40, the translation axis assembly 50, and the imaging device 200 as a whole can be moved to fall on the driving shaft of the driving part 40b. After the adjustment, the turning part 584b of the wrench 5843 can be turned to compress the pad 5842, reducing the size of the locking hole 533, such that the locking assembly 584 can tightly hold the connecting plate 55 and the third supporting arm 53, i.e., the connecting plate 55 is tightly held in the penetration hole 530 and tightly fitted to the third supporting arm 53 to achieve locking.

In some other embodiments, the rotary handle 5820 can be replaced with a driving motor that can drive the lead screw 582 to rotate.

The structure of the center-of-gravity adjusting device 58 is not limited to that described above, so long as the position of the third supporting arm 53 on the connecting plate 55 can be adjusted to adjust the center of gravity of the pitch axis assembly 10, the support assembly 20, the roll axis assembly 40, the translation axis assembly 50, and the imaging device 200 as a whole to fall on the driving shaft of the driving part 40b.

The gimbal platform of the present disclosure comprises the center-of-gravity adjusting device for adjusting the position of the third supporting arm on the connecting plate. The gimbal platform can adjust the center of gravity of the gimbal platform by the center-of-gravity adjusting device.

The description above merely includes some embodiments of the present disclosure and is not intended to limit the scope of the present disclosure. Any equivalent structures or equivalent procedures based on the contents of the description and the accompanying drawings of the present disclosure or applied in other relevant technical fields directly or indirectly should likewise be encompassed in the scope of the present disclosure.

What is claimed is:

1. A translation axis assembly, comprising:
   a supporting arm including a penetration hole and a locking hole in communication with the penetration hole;
   a connecting plate accommodated in the penetration hole; and
   a center-of-gravity adjusting device connected between the supporting arm and the connecting plate, and configured to adjust a position of the supporting arm on the connecting plate to adjust a center of gravity of the translation axis assembly, the center-of-gravity adjusting device comprising a locking assembly configured to:
   allow the supporting arm and the connecting plate to be in a loose fit or to hold tightly to each other; and
   reduce a size of the locking hole to hold the supporting arm tightly in the penetration hole.

2. The translation axis assembly of claim 1, wherein the locking assembly comprises:
   a pad including a via hole and arranged on a side of the supporting arm close to the locking hole;
   a wrench including a first through-hole;
   a pin arranged in the first through-hole and including a second through-hole; and
   a fixing bolt passing through the second through-hole and the via hole, the fixing bolt being in a threaded connection with a threaded hole in the connecting plate.

3. The translation axis assembly of claim 2, wherein the pad is made of polyoxymethylene.

4. The translation axis assembly of claim 2, wherein the threaded hole in the connecting plate runs through the locking hole.

5. The translation axis assembly of claim 1, wherein:
   the center-of-gravity adjusting device further comprises:
   a lead screw; and a moving member rotatably and movably arranged on the lead screw, the moving member being received in the penetration hole and fixedly connected to the supporting arm, and the moving member including a threaded hole in a threaded connection with the lead screw, the connecting plate is arranged in the moving member, and the connecting plate comprises a bearing arranged inside the connecting plate, one end of the lead screw being sheathed in the bearing.

6. The translation axis assembly of claim 5, wherein:
the penetration hole comprises:
  a first receiving hole of a rectangular shape; and
  a second receiving hole of a circular arc shape and in communication with the first receiving hole,
the connecting plate comprises a first guide part and a second guide part connected to the first guide part, the first guide part extending on an outer side surface of the second guide part and protruding relative to the second guide part, and the second guide part matching the second receiving hole,
the moving member matches the first receiving hole and is fixedly arranged in the first receiving hole.

7. The translation axis assembly of claim 6, wherein the moving member comprises:
  a first moving part;
  a second moving part connected to the first moving part and extending on both sides of the first moving part, the second moving part being configured to clamp the first guide part; and
  a moving member guide part, the threaded hole in the moving member being provided at the moving member guide part.

8. The translation axis assembly of claim 7, wherein a central axis of the threaded hole in the moving member is approximately parallel to a lengthwise direction of the lead screw.

9. The translation axis assembly of claim 5, wherein:
the connecting plate comprises:
  a bottom surface in contact with the supporting arm and including a receiving groove; and
  an outer side wall including a shaft hole,
the bearing is fixed in the receiving groove, and
the lead screw passes through the shaft hole and is sheathed in the bearing of the receiving groove.

10. The translation axis assembly of claim 9, further comprising:
  a rotary handle provided at an end of the lead screw closer to the outer side wall.

11. The translation axis assembly of claim 10, wherein the center-of-gravity adjusting device further comprises a fixing plate fixed to the outer side wall, and a size of the fixing plate being larger than a size of the outer side wall.

12. The translation axis assembly of claim 11, wherein:
an end face of the fixing plate distal from the connecting plate includes a groove, the bottom of the groove including a through-hole for the lead screw to pass through, and the rotary handle is partially received in the groove and is configured to rotate in the groove.

13. The translation axis assembly of claim 1, further comprising:
  a driving device arranged at one end of the supporting arm; and
  a battery arranged on the supporting arm.

14. A gimbal platform comprising:
  a pitch axis assembly;
  a roll axis assembly in pivot connection with the pitch axis assembly and configured to drive the pitch axis assembly to rotate; and
  a translation axis assembly in pivot connection with the roll axis assembly and configured to drive the roll axis assembly to rotate, the translation axis assembly comprising:
    a supporting arm including a penetration hole and a locking hole in communication with the penetration hole;
    a connecting plate accommodated in the penetration hole; and
    a center-of-gravity adjusting device connected between the supporting arm and the connecting plate, and configured to adjust a position of the supporting arm on the connecting plate to adjust a center of gravity of the translation axis assembly, the center-of-gravity adjusting device comprising a locking assembly configured to:
      allow the supporting arm and the connecting plate to be in a loose fit or to hold tightly to each other; and
      reduce a size of the locking hole to hold the supporting arm tightly in the penetration hole.

15. The gimbal platform of claim 14, further comprising:
  a support assembly movably arranged at the pitch axis assembly.

16. The gimbal platform of claim 14, wherein the pitch axis assembly comprises:
  a pillar;
  a guide post approximately perpendicular to the pillar; and
  a position-locking device arranged at an end of the guide post and coupling the guide post to the pillar, the position-locking device being configured to move along a lengthwise direction of the pillar to cause the guide post to move along the lengthwise direction of the pillar.

17. The gimbal platform of claim 16, wherein:
the position-locking device comprises a collar including a snapping hole and a receiving hole, an axial direction of the snapping hole being approximately perpendicular to an axial direction of the receiving hole,
a shape and a size of the snapping hole correspond to a shape and a size of the pillar, respectively,
the pillar is sheathed in the snapping hole, and
the receiving hole receives one end of the guide post.

18. The gimbal platform of claim 17, wherein the position-locking device further comprises a locking member configured to lock the guide post on the pillar.

* * * * *